United States Patent [19]
Haruta

[11] Patent Number: 5,633,967
[45] Date of Patent: May 27, 1997

[54] WAVEGUIDE FIBER OPTICAL COUPLER

[75] Inventor: Koichi Haruta, Sodegaura, Japan

[73] Assignee: Mitsui Petrochemical Industries, Ltd., Tokyo, Japan

[21] Appl. No.: 419,601

[22] Filed: Apr. 10, 1995

[30] Foreign Application Priority Data

Apr. 11, 1994 [JP] Japan .................. 6-072068

[51] Int. Cl.$^6$ ........................... G02B 6/26
[52] U.S. Cl. ................... 385/50; 385/33; 385/43
[58] Field of Search ................. 385/15, 31, 33, 385/38, 39, 43, 46, 47, 50, 133, 89, 125, 146, 902

[56] References Cited

U.S. PATENT DOCUMENTS

| | | | |
|---|---|---|---|
| 4,504,111 | 3/1985 | Hunzinger | 385/31 X |
| 4,697,867 | 10/1987 | Blanc et al. | 385/43 |
| 4,744,615 | 5/1988 | Fan et al. | 385/33 X |
| 4,763,975 | 8/1988 | Scifres et al. | 385/33 |
| 4,807,954 | 2/1989 | Oyamada et al. | 385/43 |
| 5,396,570 | 3/1995 | Jenkins et al. | 385/46 X |

FOREIGN PATENT DOCUMENTS

| | | |
|---|---|---|
| 0342836 | 11/1989 | European Pat. Off. . |
| 246177 | 5/1987 | German Dem. Rep. . |
| 4011553 | 4/1991 | Germany . |
| 4322892 | 3/1993 | Japan . |

*Primary Examiner*—John D. Lee

[57] ABSTRACT

The device is constructed by an optical waveguide having an incident port for receiving incidence of energy lights from plural systems, an inner reflection surface which is a closed surface provided from the incident port to the rear thereof and an irradiation port formed on the rear end part of the inner reflection surface for irradiating the energy lights and an optical fiber disposed on the rear side of this optical waveguide for receiving incidence of the energy lights irradiated from this irradiation port. Thus, it is possible to couple energy lights from plural systems in single focus without needing any precise arrangement of optical elements.

27 Claims, 9 Drawing Sheets

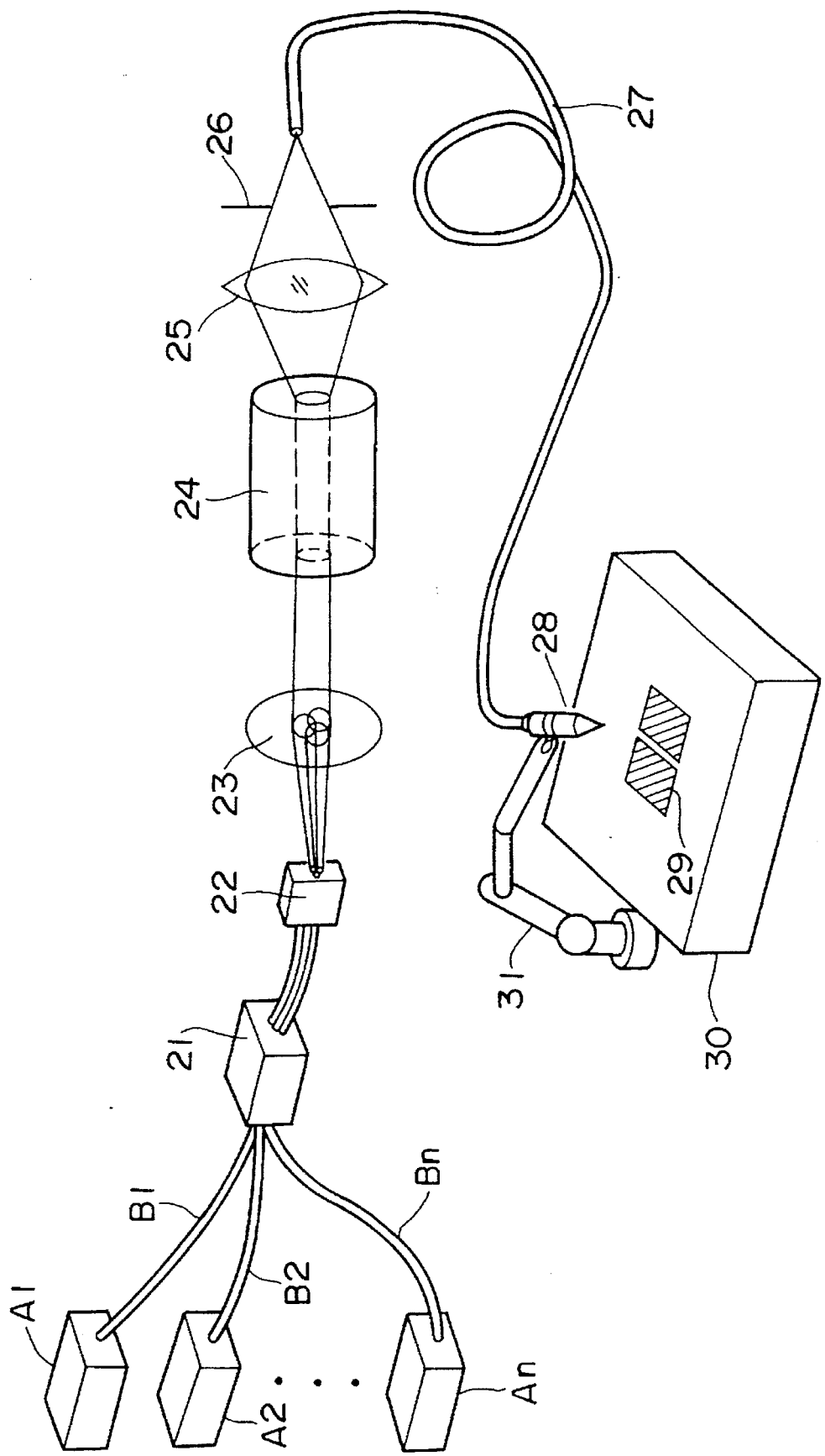

WAVEGUIDE FIBER OPTICAL COUPLER

BACKGROUND OF THE INVENTION

The present invention relates to a fiber optical coupler for coupling energy lights from a plurality of systems into a single optical fiber (light guide fiber). For example, the invention relates to an optical fiber coupler for coupling laser beam transmitted by a plurality of optical fibers, in particular the one for coupling power laser beams transmitted by a plurality of optical fibers.

The energy lights transmittable through optical fiber includes illuminating lights, laser beams, etc. When these illuminating lights and laser lights were transmitted through the optical fiber, one light source device or one laser oscillator was optically connected to a single optical fiber. Then, through this single optical fiber the energy lights were transmitted to their utilization points. When a power exceeding the maximum output of one laser oscillator is necessary, outputs from a plurality of laser oscillators must be combined and a workpiece must be irradiated with them. Similarly, in the case where illuminating light transmission by this type of optical fiber is applied to an illuminating light transmitting device needing a large light quantity, it is also necessary to couple illuminating lights from a plural number of optical fibers respectively connected to a plurality of illuminators with a single optical fiber. Further, when power laser beams and guiding visible laser beams are transmitted by one and the same optical fiber, it is necessary to couple power laser beams from the optical fiber therefor and visible laser beams from the optical fiber therefor.

Thus, conventionally, various types of fiber optical coupling systems have been offered. For example, according to the one disclosed in Japanese Patent No. 2-50105, as shown in FIG. 10, power laser beams emitted from the optical fibers 100 are made to parallel lights respectively by the very small collimating lenses 101. These paralleled power laser beams are made incident on different parts of the single condenser lens 102. Then, the optical axes of these power laser beams are bent toward the focus of the condenser lens 102 and converged thereat. At this coupling system in FIG. 10, a workpiece was directly disposed on the focus of this condenser lens 102 and processed.

According to the one disclosed in Japanese Patent 4-322892, as shown in FIG. 11, after power laser beams of plural systems are made to parallel beams respectively, they are disposed in parallel to one another using prism type mirrors 200. These parallely disposed power laser beams are made incident on a plurality of places of the single condenser lens 201 including the central axis. Then, they are converged by the condenser lens 201 and made incident on the optical fiber at the downstream side. However, at the fiber optical coupling systems of these conventional types, various problems as described below were created.

At the one disclosed in Japanese Patent No. 2-50105, when a workpiece is disposed on the focal surface 104, though focuses can surely be coupled on a single spot, laser beams can not be coupled on the front and rear thereof. That is, the spot is divided into three different ones. Thus, even if it is considered that the optical fiber on the downstream side is disposed on the rear side of the condenser lens 102 and laser beams are coupled, it will be difficult to put it into practice, as it is made necessary to exactly dispose the incident plane of the optical fiber on the downstream side on the focal surface 104. In particular, when the one having a small diameter is used as the optical fiber on the downstream side, it will be almost impossible to realize it, as it is made necessary to adjust the position of a high precision optical device.

Further, at the one disclosed in Japanese Patent No. 4-322892, the optical axes of irradiated power laser beams must be disposed in a direction orthogonal to the optical axis of the condenser lens 201 and the reflection surfaces of the prism type mirrors 200 must be disposed inclined 45° respectively against the optical axes thereof. Likewise, respective optical elements must be precisely arranged. When a single condenser lens is used, it may not be easy to prevent the effect of aberration(astigmatism). Therefore, power laser beams made incident on the vicinity of the optical axis of the condenser lens 201 are converged into focus afar while those made incident on the peripheral part thereof are converged into focus near and they are never converged at one place. Further, beam forms are distorted by reflection of the prism type mirrors, and as the effects of heated lens phenomena by the condenser lens 201 are made ununiform when differences in outputs of the respective power laser beams are generated, the beam forms will be further distorted and shifts will be generated in the focuses. Thus, in particular, when the one having a small diameter is used as the optical fiber on the downstream side, it will be difficult to make all the power laser beams incident on this optical fiber and couple them.

As described above, at any of the conventional fiber optical coupling systems, it was difficult to make the energy beams from plural systems incident on the optical fiber with a small diameter and couple them. Further, even if it is possible to couple them on the incident plane of the optical fiber on the downstream side at certain output values by precisely arranging the optical elements, shifts in the optical axes and multifocuses at condensing points will be generated by the heated lens fluctuations of the optical elements when the output values are changed. Thus, parts other than the core of the fiber is irradiated with high power beams causing damages to the edge surface and internal parts.

SUMMARY OF THE INVENTION

Against such a background, it is an object of the present invention to provide a fiber optical coupler capable of coupling the energy lights from plural systems and of introducing them into a single optical fiber, wherein the precise arrangement of optical elements is not necessary and whrein a single focus is generated, and no multifocuses are generated even when the outputs of light sources in the plural systems are changed.

These and other objects and advantages are obtain by providing fiber optical coupler according to the present invention having an optical waveguide with an incident port through which the energy lights from plural systems are made incident, an inner reflection surface which is closed formed from the incident port to the irradiation port thereof, and irradiation port formed on the rear end part of the inner reflection surface through which the energy lights are irradiated, and is provided with an optical fiber disposed on the rear side of this optical waveguide for receiving the energy lights irradiated through this irradiation port.

It is possible to embody the idea of the present invention in various modes as shown below.

The optical waveguide is capable of irradiating optical beams as a multimode irrespective of whether the incident beams are single mode or multimode. This characteristic is not dependent on the cross-sectional shape of the optical waveguide. Thus, the cross-sectional shape of the optical waveguide may be circular, square or some other shape. However, considering efficiency when lights are made incident on the optical fiber having a circular incident plane (core), a circular form is preferred.

More particulary, the cross-sectional shape of this optical waveguide may be selected to be of a cylindrical type whose inner diameter does not change from the incident port to the irradiation port, or of a tapered type whose diameter gradually declines from the incident port to the irradiation port. In the case of the latter, the beam diameter of the irradiation port may be made smaller than those of the incident lights. Thus, by making the diameter of the irradiation port smaller than the core diameter of the optical fiber, the lights irradiated therethrough may be directly introduced to the optical fiber. Also, in the case where a condenser lens(convergent system lens) is disposed between the irradiation port and the optical fiber, it is advantageous in that a spot diameter may be made small when lights are made incident on the incident plane of the optical fiber. On the other hand, when the inner diameter does not change, the reflection angles of incident light beams are constant irrespective of the length of the optical waveguide(i.e., the number of reflecting times) and the problem of returning of the incident light beam, caused by the changes of the reflection angles will not be created. Thus, by increasing the length of the optical waveguide and increasing the number of reflecting times, the characteristic of the irradiated lights on the multimode may be improved.

Further, this optical waveguide is formed of a layer where the refractive index is high and a layer where the refractive index is low and lights are transmitted being reflected on the boundary (inner reflection surface) therebetween. In this way, the present invention allows use of the optical waveguide(a kaleidoscope) wherein, e.g., an air layer is surrounded by a metal and the surface of this metal is used as the inner reflection surface or e.g., an optical waveguide, wherein a dielectric medium(a glass, etc.,) having a high refractive index is surrounded by a dielectric medium(a glass, air, metallic coating, etc.,) layer having a low refractive index and the inner surface of the latter, that is, the boundary, is used as the inner reflection surface.

Further, a plurality of incident ports of the optical waveguide may be provided. In this case, a Y branch and grating are provided within the optical waveguide and thereby coupling is allowed therewithin.

Further, the relation between the optical waveguide and the optical fiber on the downstream side may be determined by the following expression:

$$N\theta + \alpha + \beta < (r_{out}\phi/R_1)\cdot\sin^{-1}NA_{out}\phi_1.$$

Herein, N indicates the number of times that the laser beam reflects on the reflection surface within the optical waveguide; $\theta$ the total angle of the reflection surface 4c (in FIG. 2) therewithin, $\alpha$ the inclined angle of the optical axis of a laser beam made incident on the optical waveguide to the axis thereof, $\beta$ the convergent angle of this laser beam, $r_{out}\phi_1$ the core radius of the optical fiber on the downstream side, $R_1$ the radius of the irradiation port of the optical waveguide and $NA_{out}\phi_1$ the numerical aperture of the incident end of the optical fiber 7 on the downstream side.

"Plural systems" or "Energy lights from plural systems" mean that lights from a plurality of light sources or laser oscillators have been transmitted by different systems, respectively. This type of transmission is not limited to transmission by means of an optical fiber, but also includes, transmission of lights in the air (in the case of a laser beam) or via a relay lens (in the case of an illuminating light).

Herein, the term "energy lights" means that lights are treated paying attention to their use as energy, that is, illuminating, heat processing, etc. This type of energy light includes an illuminating light, a power laser beam and a guiding visible light.

The optical fiber used by the present invention includes a single fiber system wherein energy lights are transmitted by only one optical fiber, and a fiber bundle system wherein energy lights are transmitted by a bundle of optical fibers. In the case of the former, as cores for transmitting lights within the optical fiber concentrate on the center thereof, laser beams may be collected only on the core parts of the incident end surface. On the other hand, in the case of the latter, as the diameter of each single fiber is made small, the bending characteristic of the optical fiber may be improved.

Thus far, the essential components of the device according to the present invention have been described. However, other components described below may also be added.

In addition to the optical waveguide and the optical fiber, it is possible to add an optical fiber for introducing energy lights provided between the light source or the laser oscillator and the optical waveguide. For this optical fiber introducing energy light, as in the case of the optical fiber described above, the single fiber system or the fiber bundle system may be used. This optical fiber may be set by determining the position and the direction of its exiting end so as to make energy lights irradiated therefrom incident on the incident port of the optical waveguide. Thus, compared with the cases where other optical systems are used and lights are transmitted in the air, its setting is easier.

In addition to the optical waveguide, the optical fiber and the optical fiber introducing energy light, it is possible to add a first lens for introducing energy light provided between the optical fiber introducing energy light and the optical waveguide. This first lens is one of the convergent system lenses including various convex lenses, rod lenses, etc. Its function is to limit diffusion of irradiated energy lights emanating from the irradiating end surface of the optical fiber introducing energy light, and to make these energy lights incident on the incident port of the optical waveguide. Thus, by using this first lens for introducing energy light, the energy lights may be brought in without increasing the diameter of the incident port of the optical waveguide and with less losses. Also, in order to further improve this effect, the irradiating end surface of the optical fiber for introducing energy light is only to be disposed on a place farther than the incident side focusing position of the first lens. In this way, the energy lights are converged at a point which is located on the side of the irradiating surface of the first lens introducing the energy light. If the incident port of the optical waveguide is disposed on this convergent point, the diameter thereof may be further reduced.

As for apertures, an aperture for giving off stray light energies to the outside of the system may be used. In this case, such materials as ceramic, copper and the like are used for composing this. On the other hand, in order to utilize stray light energies, use of a ring-shaped parabolic reflector as an aperture is allowed. In this case, as the stray light energies are returned to an upstream side hollow waveguide, transmission losses may be limited. The aperture is provided on the front or the rear of a second energy light introducing lens described below.

In addition to the optical waveguide and the optical fiber, it is possible to add a second lens introducing energy light provided therebetween. This second lens introducing energy light is one of the convergent system lenses including various convex lenses, rod lenses, etc. Its function is to converge irradiated energy lights emanating from the irradiating port of the optical waveguide and to make them incident on the incident end surface of the optical fiber. Thus, by using this second lens for introducing energy light, energy lights may be brought in without decreasing the diameter of the irradiation port of the optical waveguide more than the core diameter of the incident end surface of the optical fiber and with less losses.

In addition to the optical waveguide and the optical fiber, it is possible to add a condenser lens disposed on the rear of the irradiating end surface of this optical fiber. This condenser lens belongs to the convergent system lenses including various convex lenses, rod lenses, etc. Its function is to converge irradiated energy lights emanating from the irradiating end surface of the optical fiber and to form spots of power laser beams on a workpiece.

Thus far, reference has been made to the possible addition of optical fiber introducing the energy light, the first lens introducing energy light, the second lens introducing the light, the aperture and the condenser lens to the optical waveguide and the optical fiber which are the essential components of the device. These additional components are not essential and may be used in various combinations. For example, the fiber introducing the energy light and the second optical fiber introducing the energy light may be combined, or all of them may be used in combination.

The optical fiber coupler according to the present invention may be applied to all the devices for transmitting illuminating lights or laser beams utilizing the optical fiber. For example, it may be applied to medical and industrial laser beam machines.

According to the present invention, energy lights sent through the transmission lines from plural systems are made incident into the inside of the optical waveguide through the incident port thereof. These incident energy lights are multiplexedly reflected and uniformly mixed therewithin. Consequently, they are irradiated from the irradiation port as multimode beams. These emitted multimode lights are roughly equal to lights emitted from a single light source. Thus, as in the case of lights emitted from the single light source, they may be made incident on the incident end surface of the optical fiber in single focus.

Further, when an optical waveguide having an inner reflection surface whose diameter gradually declines from the incident port to the irradiation port is used, respective laser luminous fluxes made incident on this optical waveguide may be multiplexedly reflected on this inner reflection surface. In this case, they are coupled as uniform multibeams having no directions, condensed as they advance on the inner reflection surface and irradiated from the irradiation port. The laser luminous fluxes thus irradiated are provided with uniform strength distribution in a circumferential direction and diffused at constant angles. Then, they are made incident on the incident end surface of the optical fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is an external view showing a laser beam machine using the fiber coupler according to the embodiment 2 of the present invention.

PREFERRED EMBODIMENT OF THE INVENTION

Figure 1:
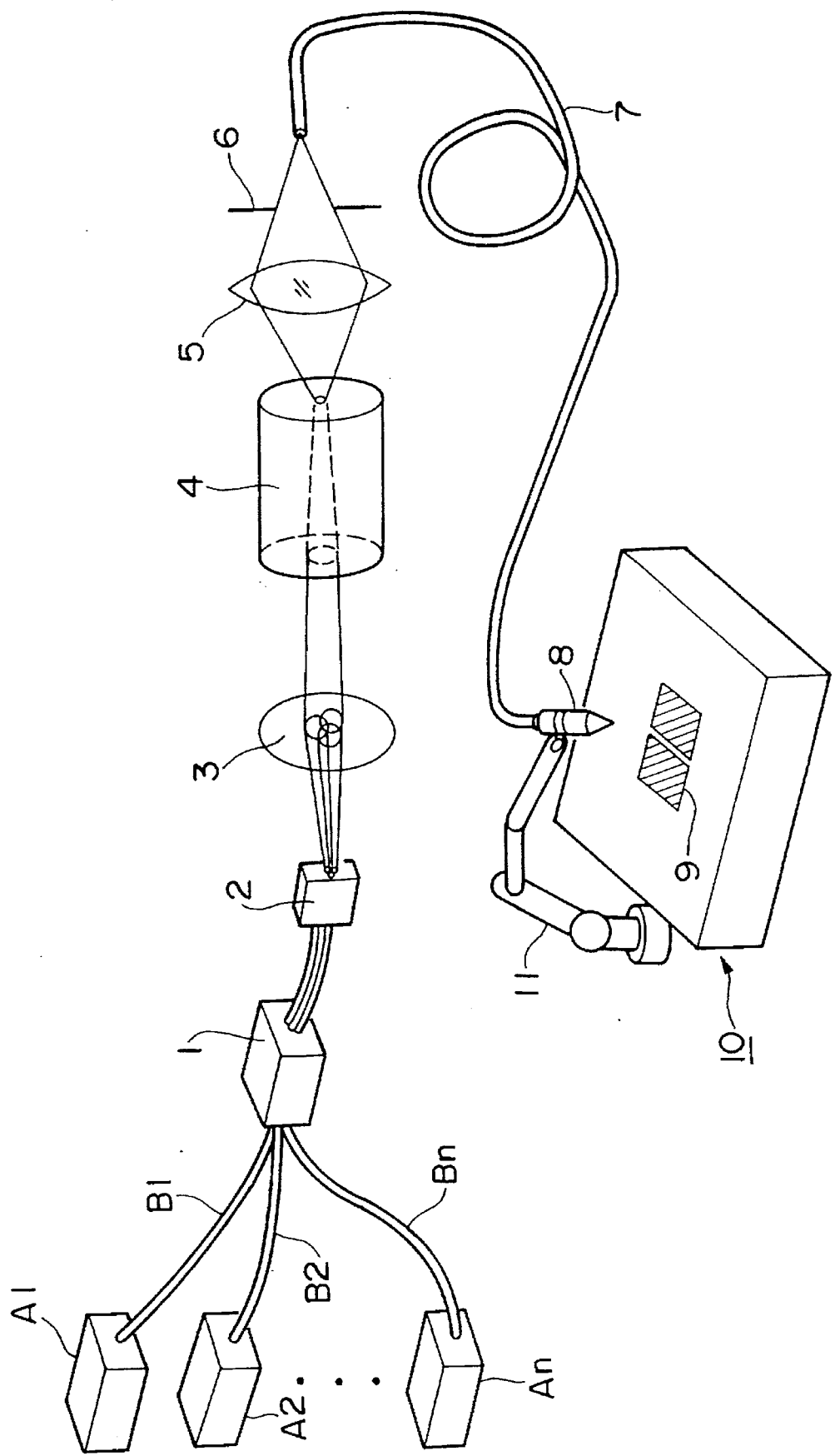
FIG. 1 is an external view showing a laser beam machine using the fiber coupler according to the embodiment 1 of the present invention.

1. FIG. 1 is an outline external view showing an industrial laser beam machine incorporating the fiber coupler according to the first embodiment of the present invention. As shown in this Figure, the laser beam machine according to this embodiment is constructed by laser oscillators A for irradiation power laser beams, optical fibers B on the upstream side from plural systems connected thereto, a fiber unifier 1 provided on the mid-way of these optical fibers B on upstream side, a fiber connector 2 provided on the irradiating end parts thereof, a first condenser lens 3, a tapered type hollow waveguide 4, a second condenser lens 5, an aperture 6 and a optical fiber 7 on the downstream side disposed in order on the optical axes of irradiated lights therefrom, a headpiece 8 attached to the irradiating end of this optical fiber 7 on the downstream side, an articulated robot 11 for freely movably holding this headpiece 8 and a machining station 10 which is a working table whereon a workpiece 9(work) to be processed by this headpiece 8 is set. Each of these parts will be described below in detail.

The laser oscillators A are for oscillating power laser beams of high density and they are gas lasers of Ar lasers, etc., or solid lasers of YAG (yttrium aluminum garnet) lasers, etc. When the YAG lasers are used for these laser oscillators A, a laser power of about 800W may be output from one laser oscillator A. A plural number of these laser oscillators A must be provided. That is, the laser oscillators A in number at least equivalent to the one obtained by dividing the power output necessary for processing a workpiece by that of each oscillator A must be provided.

The optical fibers B on the upstream side for introducing the energy light are for transmitting the laser beams oscillated by the laser oscillators A. These upstream side optical fibers B are disposed in the same number as those of the laser oscillators A, the incident ends of the respective fibers B are connected to the laser oscillators A, collected into a bundle by the fiber unifier 1 at the middle part and connected to the fiber connector 2 to become irradiating end parts. The fiber connector 2 is for fixing the irradiating ends of the respective optical fibers B. By means of this, the irradiating ends thereof are fixed in parallel to one another and in a direction toward the central axis C of the tapered hollow waveguide 4.

Figure 2:
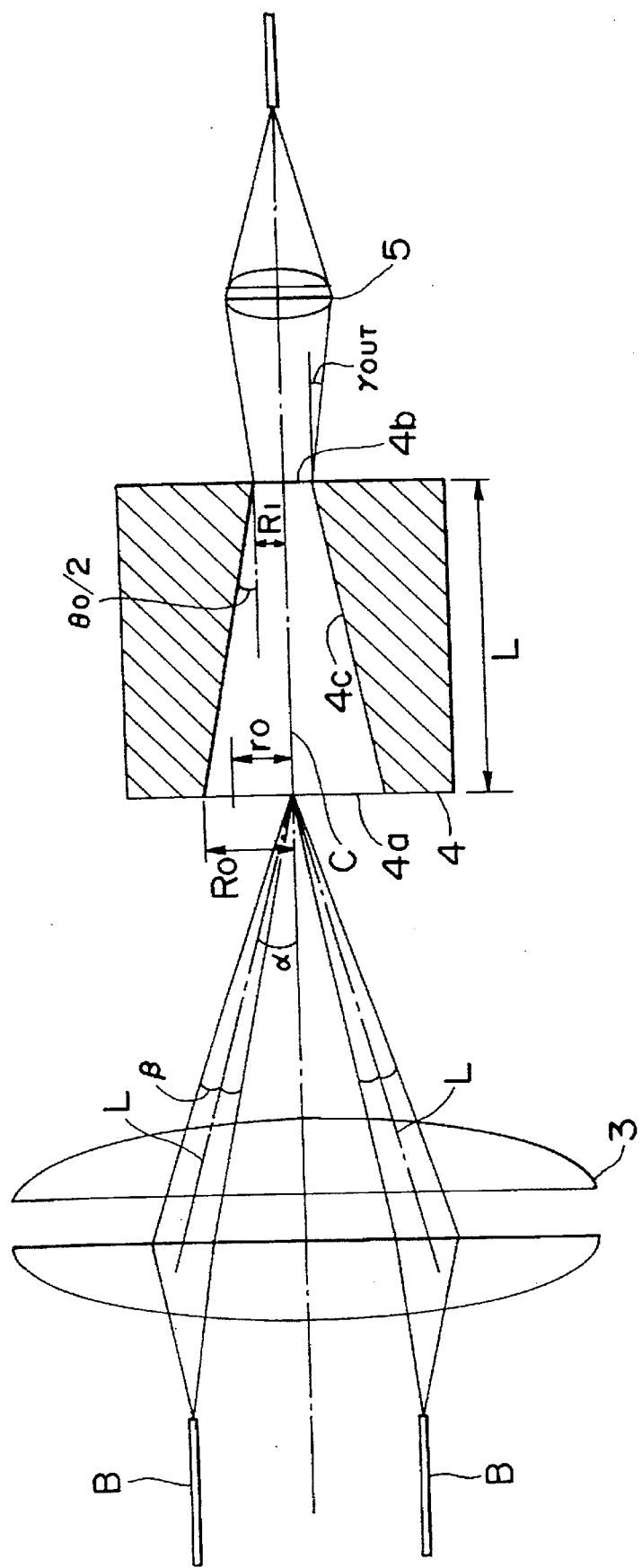
FIG. 2 is a sectional view showing the main parts of the machine in FIG. 1.

The first condenser lens group 3 as the first lens introducing energy light is a positive lens group wherein two pieces of flat convex lenses are disposed with their planes adjacent to each other and is disposed coaxially with the central axis C of the tapered hollow waveguide 4. Laser luminous fluxes irradiated from the respective optical fibers B are made incident on a plurality of spots on the first condenser lens group 3. Then, the optical axes L of these laser luminous fluxes are bent toward the incident port of the tapered hollow waveguide 4 by the refractive force of the first condenser lens group 3. At the same time, as shown in FIG. 2, the laser luminous fluxes are guided in the vicinity of the central axis C of the tapered hollow waveguide 4. Further, the convergent angles β of the laser luminous fluxes at this time are represented by the following expression:

$$\beta = (f_{10}/f_{11}) \times NA_{in\phi_1} \tag{1}$$

Herein, $f_{10}$ indicates a distance from the irradiating end surface of the optical fiber B on the upstream side to the incident side main point of the first condenser lens group 3. Also, $f_{11}$ is a distance from the irradiating end main point of the first condenser lens group 3 to the condensing point. $NA_{in\phi_1}$ is the numerical aperture of the irradiating end surface of the optical fiber B.

The tapered hollow waveguide 4 as the optical waveguide is the one made, for example, by cutting the inside of a brass block and making a hole in a tapered shape and gilding its inner surface. As shown by the sectional view in FIG. 2, this tapered hollow waveguide 4 is provided with a relatively large diameter incident port 4a and a relatively small diameter irradiation port 4b. Then, between these incident port 4a and irradiation port 4b a tapered inner reflection surface 4c whose inner diameter changes gradually and uniformly is provided.

The radius $R_0$ this incident port 4a is determined by the following condition:

$$R_0 > r_0 = (f_{11}/f_{10}) \times r_{in\phi_1} \tag{2}$$

Herein, $r_0$ indicates a range for forming images on the irradiating end surface of the optical fiber B at a convergent point. That is, it is the range for expansion of the laser luminous fluxes. Also, $r_{in\phi_1}$ indicates the core radius of the optical fiber B on the upstream side.

On the other hand, a distance from the irradiation port 4b of the tapered hollow waveguide 4 to the optical fiber 7 on the downstream side may be obtained by the following relational expression in accordance with the Lagrangian law:

$$R_1 \cdot \gamma_{out} = \omega \cdot \sin^{-1} NA_{out\phi_1} \tag{3}$$

Figure 5:
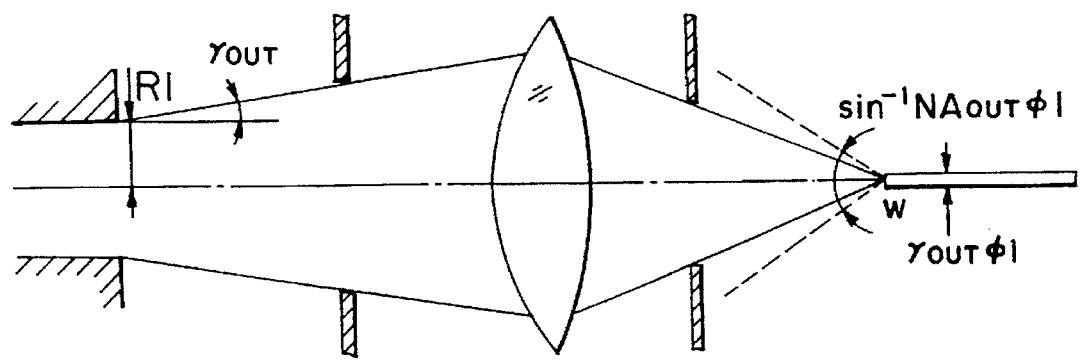
FIG. 5 is a view illustrating an aperture in FIG. 1.

As shown in FIG. 5, $R_1$ is the radius of the irradiation port 4b of the tapered hollow waveguide 4, $\gamma_{out}$ is a light expansion angle at the irradiation port, ω is a spot radius at the incident end of the optical fiber 7 on the downstream side and $NA_{out\phi_1}$ is the numerical aperture of the incident end thereof. The condition for incidence on the optical fiber on the downstream side is that its core radius $\gamma_{out\phi_1}$ must be larger than the spot radius ω. Thus, by combining this condition and the expression (3), the following relational expression is obtained:

$$\gamma_{out} < (\gamma_{out\phi_1}/R_1) \cdot \sin^{-1} NA_{out\phi_1} \tag{4}$$

Figure 3:
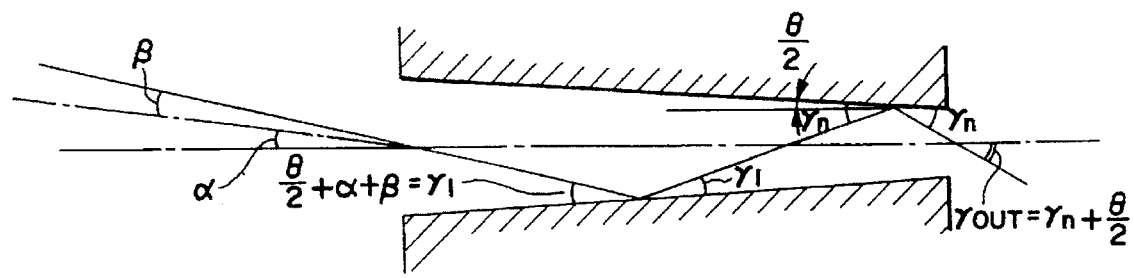
FIG. 3 is a view illustrating the reflection angles of laser lights within the tapered hollow waveguide in FIG. 2.

Also, from FIG. 3, $$\gamma_{out} = (N - \frac{1}{2})\theta + \alpha + B + \frac{\theta}{2} \tag{5}$$

Herein, θ means the total angle of the reflection surface 4c of the tapered hollow waveguide. Also, α is the inclined angle of the optical axis L of a laser beam irradiated from the optical fiber B on the upstream side to the axis C of the tapered hollow waveguide 4 after bending by the first condenser lens 3. N is the number of reflecting times of a laser beam on the tapered inner reflection surface 4c of the hollow waveguide 4 and it is a value to be determined by the following way. That is, an optical path within the hollow waveguide is unequivocally determined and a reflecting position is represented by a 2-dimensional coordinate within a plane including the optical path C. For example, when the longitudinal direction of the hollow waveguide 4 is x and the diameter direction of the hollow waveguide 4 within the plane including the optical path C is y, in the case of the tapered hollow waveguide 4, reflection is repeated and finished before a point where y becomes smaller than the diameter R of the irradiation port 4b. Thus, the value of N is determined as the number of reflecting times, that is at the time when this reflection is finished. The length L of the tapered hollow waveguide 4 is determined by the condition that it must be shorter than its position.

The following relational expression results from the expressions (4) and (5):

$$N \theta + \alpha + \beta < (\gamma_{out\phi_1}/R_1) \cdot \sin^{-1} NA_{out\phi_1} \tag{6}$$

Further, at the above expressions (4) and (6), as the core radius $\gamma_{out\phi_1}$ of the optical fiber 7 on the downstream side is expanded by the second condenser lend 5, $\gamma_{out\phi_1}$ is substituted with $\gamma'_{out\phi_1}$ corrected as in the following expression (7):

$$\gamma_{out\phi_1} = (f_{OUT0}/f_{OUT1}) \times \gamma_{out\phi_1} \tag{7}$$

Herein, $f_{OUT0}$ means a distance from the irradiation port 4b to the incident side main point of the second condenser lens group 5. Also, $f_{OUT1}$ is a distance from the irradiating side main point of the second condenser lens group 5 to the incident end surface of the optical fiber 7. Similarly, at the above expressions (3), (4) and (6), $NA_{out\phi_1}$ is substituted with $NA'_{out\phi_1}$ corrected as in the following expression (8):

$$NA'_{out\phi_1} = (f_{out1}/f_{OUTU}) \times NA_{out\phi_1} \tag{8}$$

Herein, $NA_{out\phi_1}$ is the numerical aperture of the incident end surface of the optical fiber on the downstream side.

Further, materials for the tapered hollow waveguide 4 are not limited to brass but such materials as aluminum alloy, copper alloy and the like may be used.

The second condenser lens group 5 as the second energy light introducing lens is one piece of a convex lens and disposed coaxially with the central axis C of the tapered hollow waveguide 4. Laser luminous fluxes irradiated from the irradiation port 4b thereof are made incident on the second condenser lens 5. Then, these fluxes are converged on the incident end surface of the optical fiber 7. As shown in FIG. 5, an aperture 6 is a diaphragm for preventing the generation of stray lights by limiting the outer edge of laser beams to be made incident on the incident end surface of the optical fiber 7.

The optical fiber 7 on the downstream side is for transmitting laser beams converged by the second condenser lens 5. That is, the incident end thereof is optically connected to the tapered hollow waveguide 4. The irradiating end part thereof is connected to the headpiece 8.

Figure 4:
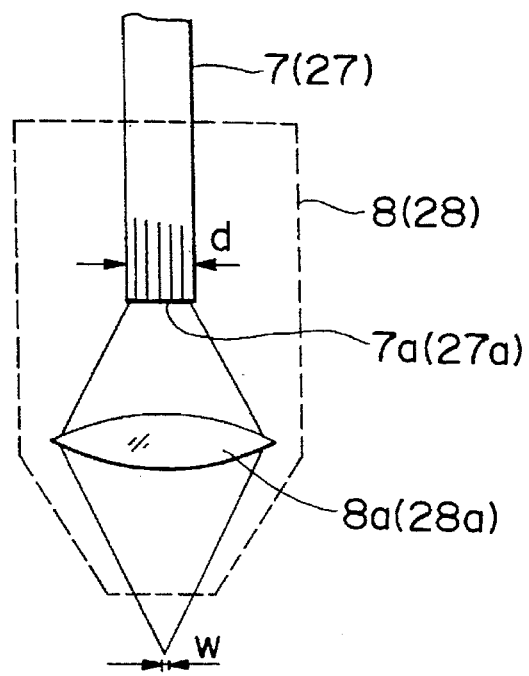
FIG. 4 is a view showing the inner construction of a head piece 8 in FIG. 1.

The inside of the headpiece 8 is constructed as shown in FIG. 4. That is, on the inside of the headpiece 8, immediately after the irradiating end surface 7a of the optical fiber 7 on the downstream side the third condenser lens 8a is fixed. This third condenser lens 8a is a convex lens and on a side outer than its incident side focussing position the irradiating end surface 7a of the optical fiber 7 is disposed. Thus, laser luminous fluxes irradiated from the irradiating end surface 7a thereof are converged by the third condenser lens 8a. The spot diameter ω at the converging point is determined by the expression below:

$$\omega = (f_2/f_1) \times d \qquad (9)$$

Herein, $f_1$ means a distance from the irradiating end surface 7a of the optical fiber 7 to the incident side main point of the third condenser lens 8a. Also, $f_2$ is a distance from the irradiating side main point of the third condenser lens 8a to the converging point and d is the core diameter of the optical fiber 7.

The articulated robot 11 is controlled by a controller (not shown in the Figure) and the headpiece 8 held by its tip is made movable three-dimensionally. The machining station 10 is a table whereon the workpiece 9(work) to be machined by moving the headpiece 8 is mounted.

According to this first embodiment, laser beams oscillated by the respective laser oscillators A1 to An and transmitted by the respective optical fibers B1 to Bm on the upstream side are irradiated from the fiber connector 2. These irradiated laser beams are made incident respectively on different spots of the first condenser lens group 3. The optical axes of these incident lights are bent by the first condenser lens group 3 and converged toward the incident port 4a of the tapered hollow waveguide 4. The laser beams made incident on the tapered hollow waveguide 4 in this way are multiplexedly reflected on the tapered inner reflection surface 4c, coupled as uniform and directionless multibeams, collected as they advance thereon and irradiated from the irradiation port 4b. These irradiated laser beams are provided with uniform strength distribution in a circumferential direction and diffused at a constant angle range α. Then, they are converged by the second condenser lens 5 and made incident on the incident end surface of the optical fiber 7. The laser beams thus made incident are transmitted therein and led to the headpiece 8 fixed on the irradiating end 7a thereof. Then, they are converged by the third condenser lens 8a and the workpiece 9(work) mounted on the machining station 10 is heated.

2. FIG. 6 is an outline external view showing the industrial laser beam machine incorporating the fiber coupler according to the second embodiment of the present invention. This second embodiment is different from the first in that instead of the tapered hollow waveguide 4 a cylindrical hollow waveguide 24 is used.

As shown in FIG. 6, the laser beam machine according to this embodiment is constructed by laser oscillators A for irradiation power laser beams, the optical fibers B on the upstream side from plural systems connected thereto, a fiber unifier 21 provided on the mid-way of these optical fibers B, a fiber connector 22 provided on the irradiating end part thereof, a first condenser lens 23, the cylindrical hollow waveguide 24, a second condenser lens 25, an aperture 26 and a optical fiber 27 on the downstream side disposed in order on the optical axes of irradiated lights therefrom, a headpiece 28 attached to the irradiating end of this optical fiber 27, an articulated robot 31 for freely movably holding this headpiece 28 and a machining station 30 which is a working table whereon a workpiece 29(work) to be processed by this headpiece 28 is set. Each of these components will be described in detail below.

The laser oscillators A are for oscillating power laser beams of high density and they are gas lasers of Ar lasers, etc., or solid lasers of YAG(yttrium aluminum garnet) lasers, etc. When YAG lasers are used for these laser oscillators A, a laser power output of about 800W may be obtained from one laser oscillator A. The plural number of these laser oscillators A must be set. That is, the same number as gained by dividing an output necessary for processing a workpiece by the output of each laser oscillator A must be set.

The optical fibers B on the upstream side are for transmitting laser beams oscillated at the laser oscillators A. These optical fibers B are disposed by the same number as that of the laser oscillators A, the incident ends of the respective optical fibers are connected to the laser oscillators A, collected in a bundle by the fiber unifier 21 at the middle, connected to the fiber connector 22 to become irradiating end parts.

The fiber connector 22 is for fixing the irradiating ends of the respective optical fibers B. By means of this, the irradiating ends thereof are fixed in parallel to one another and in a direction toward the central axis C of the cylindrical hollow waveguide 24.

Figure 7:
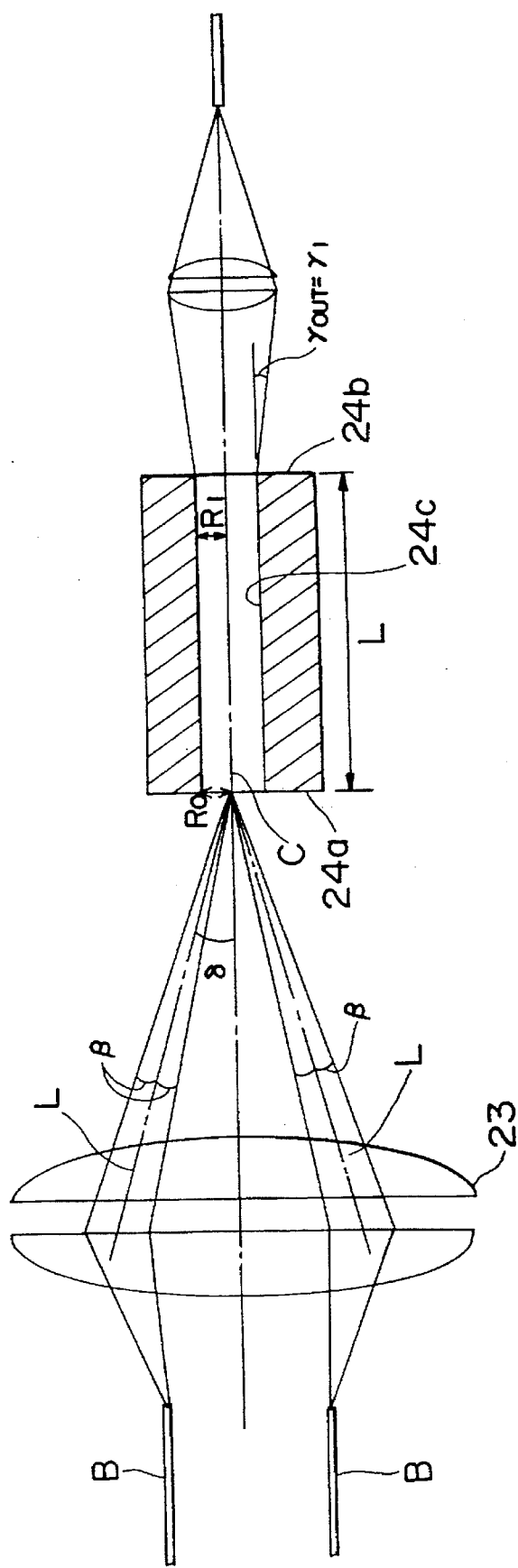
FIG. 7 is a sectional view showing the main parts in FIG. 4.

The first condenser lens group 23 as the first lens introducing energy light is a positive lens group wherein two flat convex lenses are disposed with their planes adjacently provided and disposed coaxially with the central axis C of the cylindrical hollow waveguide 24. Laser luminous fluxes irradiated from the respective optical fibers B are made incident on a plurality of spots on the first condenser lens group 23. Then, the optical axes L of these laser luminous fluxes are bent toward the central axis C of the cylindrical hollow waveguide 24 by the refractive force of the first condenser lens group 23. At the same time, as shown in FIG. 7, the laser luminous fluxes are introduced to the vicinity of the central axis C thereof. The convergent angles β of the laser luminous fluxes at this time are represented by the following expression:

$$\beta = (f_{10}/f_{11}) \times NA_{in} \phi_1 \qquad (10)$$

Herein, $f_{10}$ means a distance from the irradiating end surface of the optical fiber B on the upstream side to the incident side main point of the first condenser optical lens group 23. Also, $f_{11}$ is a distance from the irradiating side main point of the first condenser optical lens group 23 to a converging point. $NA_{in} \phi_1$ is the numerical aperture of the irradiating end surface of the optical fiber B on the upstream side.

The cylindrical hollow waveguide 24 as the optical waveguide is the one made by, for example, cylindrically cutting the inside of a brass block to make a hole and gilding its inner surface. As shown by the sectional view in FIG. 7, this cylindrical hollow waveguide 24 is provided with an incident port 24a and an irradiation port 24b having the same diameters.

The radiuses $R_0$ of these incident port 24a and irradiation port 24b are determined by the following condition:

$$R_0 > r_0 = (f_{11}/f_{10}) \times r_{in} \phi_1 \qquad (11)$$

Herein, $r_0$ is a range for forming images on the irradiating end surface of the optical fiber B at a convergent point. That is, it is the range for expansion of laser luminous fluxes. Also, $r_{in} \phi_1$ is the core of the optical fiber B.

On the other hand, the relation between the irradiation port 24b of the cylindrical hollow waveguide 24 and the optical fiber 27 is represented by the following expression in accordance with the Lagrangian law:

$$R_1 \cdot \gamma_{out} = \omega \cdot \sin^{-1} NA_{out} \phi_1 \qquad (12)$$

Herein, $R_0$ is the radius of the irradiation port 24b of the cylindrical hollow waveguide 24, $\gamma_{out}$ is a light expansion angle at the irradiation port, ω is the spot radius of the incident end of the optical fiber 27 and $NA_{out} \phi_1$ is the numerical aperture of the incident end of the optical fiber 27 on the downstream side.

The condition for incidence on the optical aperture on the downstream side is that the core radius $\gamma_{out} i_1$ of the optical fiber 27 on the downstream side must be larger than the spot radius ω. Thus, the following relational expression is obtained by combining this condition and the expression (12):

$$\gamma_{out} < (r_{out}\phi_1/R_1) \cdot \sin^{-1} NA_{out}\phi_1 \tag{13}$$

Figure 8:
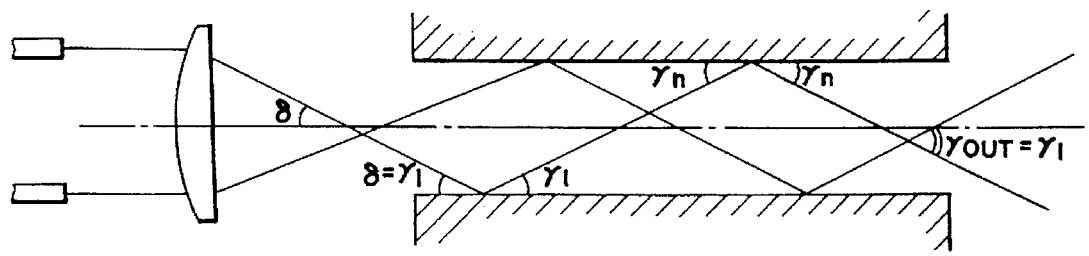
FIG. 8 is a view illustrating the reflection angles of laser beams within the cylindrical hollow waveguide in FIG. 7.

Also, from FIG. 8, $$\gamma_{out} = \delta \tag{14}$$

Herein, δ is the inclined angle of a laser beam irradiated from the optical fiber B on the upstream side to the axis C of the cylindrical hollow waveguide 24 after bending by the first condenser lens group 23.

From these expressions (13) and (14), the following relational expression result:

$$\delta < (r_{out}\phi_1/R_1) \cdot \sin^{-1} NA_{out}\phi_1 \tag{15}$$

Further, at the above expressions (13) and (14), as the core radius $r_{out1}$ of the optical fiber 27 is expanded by the second condenser lens 25, $r_{out1}\phi_1$ is substituted with $r'_{out1}\phi 1$ corrected as in the following expression (16):

$$r'_{out1}\phi 1 = (f_{OUT0}/f_{OUT1}) \times r_{out}\phi_1 \tag{16}$$

Herein, $f_{out1}$ is a distance from the irradiation port 24b to the incident side main point of the second condenser lens group 25. Also, $f_{out1}$ is a distance from the irradiating side main point of the second condenser lens group 25 to the incident end surface of the optical fiber 27.

Similarly, at the above expressions (12), (13) and (15), $NA_{OUT}\phi_1$ is substituted with $NA'_{OUT}\phi_1$ corrected as in the following expression (17):

$$NA'_{OUT}\phi_1 = (f_{OUT1}/f_{OUT0}) \times NA_{OUT}\phi_1 \tag{17}$$

Herein, $NA_{OUT}\phi_1$ is the numerical aperture of the incident end surface of the optical fiber 27.

Further, materials for the cylindrical hollow waveguide 24 are not limited to brass but aluminum alloy or copper alloy may be used.

The second condenser lens group 25 as the second lens introducing energy light is one piece of a convex lens and disposed coaxially with the central axis C of the cylindrical hollow waveguide 24. Laser luminous fluxes irradiated from the irradiation port 24b of this cylindrical hollow waveguide 24 are made incident on the second condenser lens 25. Then, these luminous fluxes are converged on the incident end surface of the optical fiber 27.

An aperture 26 is a diaphragm for preventing the generation of stray lights by limiting the circumferential edge of laser beams to be made incident on the incident end surface of the optical fiber 27.

The the optical fiber 27 on the downstream side is for transmitting laser beams converged by the second condenser lens 25. That is, the incident end thereof is optically connected to the cylindrical hollow waveguide 24. The irradiating end part thereof is connected to the headpiece 28.

The inside of the headpiece 28 is constructed as shown in FIG. 4. That is, on the inside of the headpiece 28 the third condenser lens 28a is fixed immediately after the irradiating end surface 27a of the the optical fiber 27. This third condenser lens 28a is a convex lens and the irradiating end surface 27a thereof is disposed on a place outer than its incident side focussing position. Thus, laser luminous fluxes irradiated from the irradiating end surface 27a of the optical fiber 27 are converged by the third condenser lens 28a. The spot diameter ω at a converging point is obtained by the following expression:

$$\omega = f_2/f_1 \times d \tag{18}$$

Herein, $f_1$ is a distance from the irradiating end surface 27a of the the optical fiber 27 to the incident side main point of the third condenser lens 28a. Also, $f_2$ is a distance from the irradiating side main point of the third condenser lens 28a to the converging point and d is the core diameter of the optical fiber 27.

An articulated robot 31 is controlled by a controller (not shown in the Figure) and it is for making the headpiece 28 held by its tip three-dimensionally movable. A machining station 30 is a table whereon a workpiece(work) to be processed by moving the headpiece 28 is mounted.

According to this second embodiment, laser beams oscillated by the laser oscillators A1 to An and transmitted by the optical fibers B1 to Bn are irradiated from the fiber connector 22. These irradiated laser beams are made incident on the different spots of the first condenser lens group 23. These incident laser beams are converged toward the incident port 24a of the cylindrical hollow waveguide 24 with their optical axes bent by the first condenser lens group 23. The laser beams made incident on the cylindrical hollow waveguide in this way are multiplexedly reflected on the tapered inner reflection surface 24c, coupled as uniform and directionless multibeams and irradiated from the irradiation port 24b. The laser beams thus irradiated are provided with uniform strength distribution in a circumferential direction and diffused at the range of a constant angle. Then, they are converged by the second condenser lens 25 and made incident on the incident end surface of the optical fiber 27. These incident laser beams are transmitted therewithin and led into the headpiece 28 fixed on the irradiating end surface 27a of the the optical fiber 27. Then, they are condensed by the third condenser lens 28a and the workpiece 29(work) set on the machining station 30 is heated.

Figure 9:
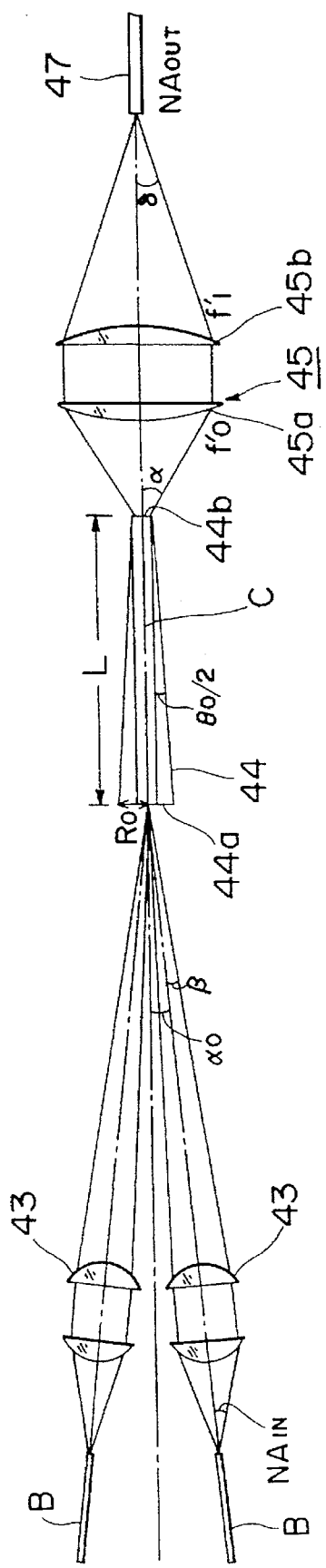
FIG. 9 is a sectional view showing the main parts according to the embodiment 3 of the present invention.
Figure 10:
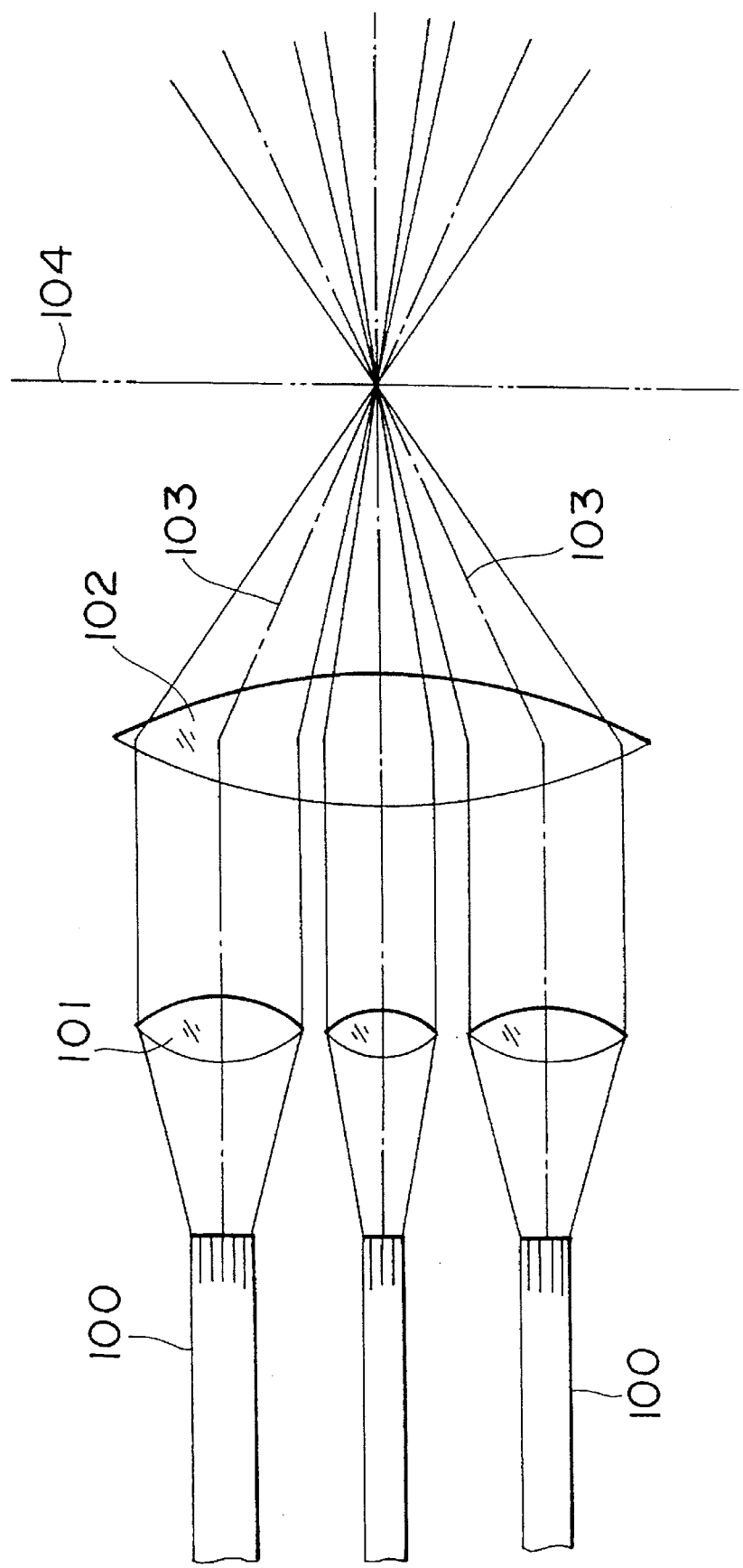
FIG. 10 is an outline sectional view showing the conventional fiber coupler.
Figure 11:
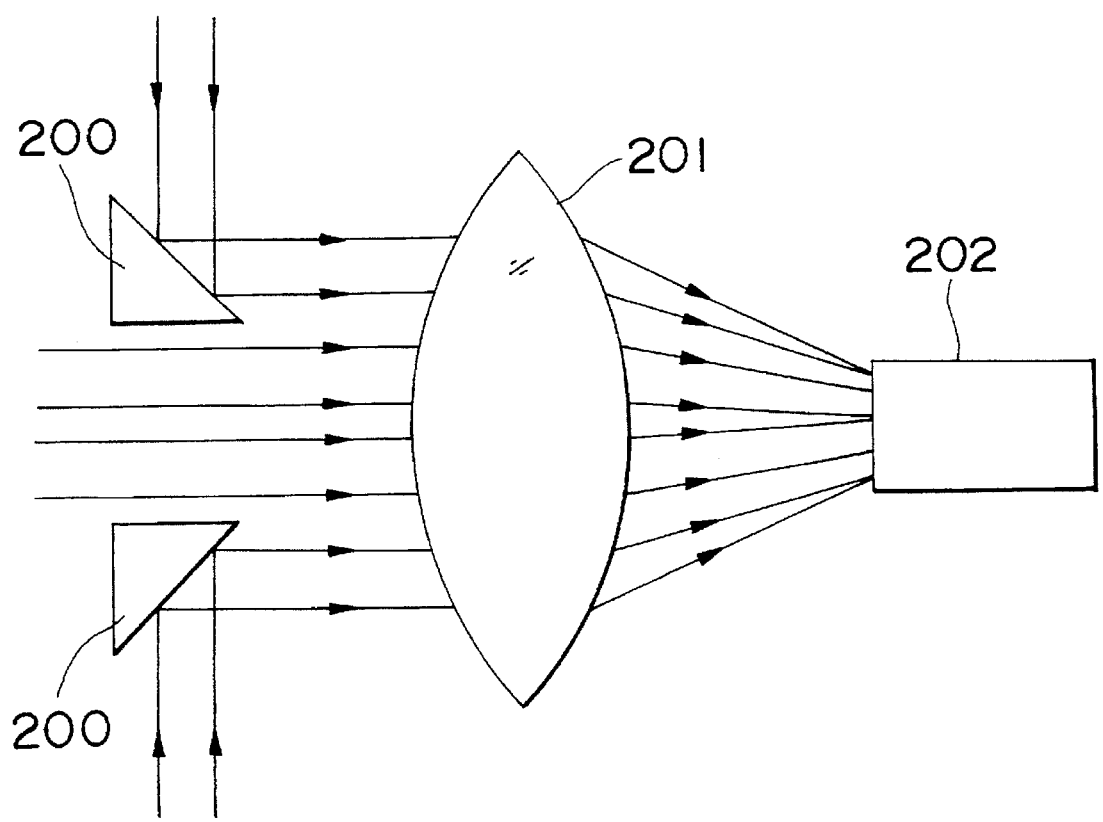
FIG. 11 is an outline sectional view showing the conventional fiber coupler.

3. FIG. 9 is a view showing the main parts of the fiber coupler according to the third embodiment of the present invention. This third embodiment is different from the first in that the irradiating end parts of the optical fibers B on the upstream side are not disposed in parallel to one another by the fiber connector 2 and not one set but plural sets of the first condenser lens groups 43 are used. It is similar to the first on other points.

As shown in FIG. 9, the optical fibers B on the upstream side as the optical fiber for introducing energy light are for transmitting laser beams oscillated by the laser oscillators (not shown in the Figure). That is, the incident ends of the respective optical fibers B on the upstream side are connected to the laser oscillators and receive the incidence of the oscillated laser beams. As for the optical fibers B on the upstream side, the same number as that of the laser oscillators are provided. The irradiating ends of the respective optical fibers B on the upstream side are fixed along the radiation around the position of the central axis C on the incident plane 44a of the tapered hollow waveguide 44.

The first condenser lens groups 43 as the first lens for introducing energy light are positive lens groups wherein two pieces of flat convex lenses are disposed with their planes adjacently placed and disposed on every optical fibers B on the upstream side. Laser luminous fluxes irradiated from the respective optical fibers B are made incident on the first condenser lens groups 43. Then, these laser luminous fluxes are converged on the central axis C of the cylindrical hollow waveguide 44. The convergent angles β of the laser luminous fluxes at this time are represented by the following expression:

$$\beta=(f_{10}/f_{11})\times NA_{in}\phi_1 \tag{19}$$

Herein, $f_{10}$ is a distance from the irradiating end surface of the optical fiber B on the upstream side to the incident side main point of the first condenser lens group 43. Also, $f_{11}$ is a distance from the irradiating side main point of the first condenser lens group 43 to the convergent point. $NA_{in}\phi_1$ is the numerical aperture of the irradiating end surface of the optical fiber B on the upstream side. The tapered hollow waveguide 44 as the optical waveguide is the one made by, for example, cutting the inside of a brass block in a tapered shape to make a hole and guiding its inner surface. As shown in FIG. 9, this tapered hollow waveguide 44 is provided with a relatively large diameter incident port 44a and a relatively small diameter irradiation port 44b. Between the incident port 44a and the irradiation port 44b a tapered inner reflection surface 44c whose inner diameter changes gradually and uniformly is provided.

The radius $R_0$ of this incident port 44a is determined by the following condition:

$$R_0>r_0=(f_{11}/f_{10})\times r_{in}\phi_1 \tag{20}$$

Herein, $r_0$ is a range for forming images on the irradiating end surface of the optical fiber B on the upstream side at the convergent point. That is, it is the range for expansion of laser luminous fluxes. Also, $r_{in}\phi_1$ is the core radius of the optical fiber B on the upstream side.

On the other hand, the relation between the irradiation port 44b of the tapered hollow waveguide 44 and the optical fiber B is obtained by the following expression in accordance with the Lagrangian law:

$$R_1\gamma_{out}=\omega\cdot\sin^{-1}NA_{out}\phi_1 \tag{21}$$

Herein, $R_1$ is the radius of the irradiation port 44b of the tapered hollow waveguide 44, $\gamma_{out}$ a light expansion angle at the irradiation port, ω the spot radius at the incident end of the optical fiber 47 on the downstream side and $NA_{out}\phi_1$ the numerical aperture of the incident end of the optical fiber 47 respectively.

The condition for incidence on the the optical fiber 47 is that the core radius $r_{out}\phi_1$ thereof must be larger than the spot radius ω. Thus, the following relational expression is obtained by combining this condition and the expression (21):

$$\gamma_{out}<(r_{out}\phi_1/R_1)\cdot\sin^{-1}NA_{out}\phi_1 \tag{22}$$

Also, from FIG. 3, $$\gamma_{out}=(N-\tfrac{1}{2})\theta+\alpha+\beta+\%  \tag{23}$$

Herein, θ is the total angle of the reflection surface 4c of the tapered hollow waveguide. Also, α is the inclined angle of the optical axis L of a laser beam irradiated from the optical fiber B to the axis C of the tapered hollow waveguide 4 after bending by the first condenser lens group 43. N is the number of laser beam reflecting times on the tapered inner reflection surface 4c of the waveguide 4 and its value is determined by the following way. That is, an optical path within the waveguide is unequivocally set and a reflection position may be represented by a two-dimensional coordinate within a plane including the optical path C. For example, when the longitudinal direction of the hollow waveguide 4 is x and the diameter direction thereof within the plane including the optical path C is y, in the case of the tapered hollow waveguide 4, reflection is repeated and finished before a point where y becomes smaller than the diameter $R_1$ of the irradiation port 4b. Thus, the numerical value of N is determined as the number of reflecting times, that is, at the time when this reflection is finished. The length L of the tapered hollow waveguide 4 is determined under the condition that it must be shorter than its position.

The following expression results from the expressions (22) and (23):

$$N\theta+\alpha+\beta<(r_{out}\phi_1/R_1)\cdot\sin^{-1}NA_{out}\phi_1 \tag{24}$$

Further, at the above expressions (22) and (24), as the core radius $r_{out}\phi_1$ of the optical fiber 47 is expanded by the first condenser lens 45, $r_{out}\phi_1$ is substituted with $r'_{out}\phi_1$ corrected as in the following expression (25):

$$r'_{out}\phi_1=(f_{OUT0}/f_{OUT1})\times r_{out}\phi_1 \tag{25}$$

Herein, $f_{OUT0}$ is a distance from the irradiation port 44b to the incident side main point of the second condenser lens group 45. Also, $f_{OUT1}$ is a distance from the irradiating side main point of the second condenser lens group 45 to the incident end surface of the optical fiber 47.

Similarly, at the above expressions (21), (22) and (24), $NA_{OUT}\phi_1$ is substituted with $NA'_{OUT}\phi_1$ corrected as in the following expression (26):

$$NA'_{OUT}\phi_1=(f_{OUT1}/f_{OUT0})\times NA_{OUT}\phi_1 \tag{26}$$

Herein, $NA_{OUT}\phi_1$ is the numerical aperture of the incident end surface of the optical fiber 7 on the downstream side.

Further, materials for the tapered hollow waveguide are not limited to brass but aluminum alloy or copper alloy may be used.

The second condenser lens group 45 as the second lens for introducing energy light is a relay lens system constructed by a collimating lens 45a which is a flat convex lens and a condenser lens 45b and a positive lens group as a whole. The second condenser lens group 45 is diplosed coaxially with the central axis C of the tapered hollow waveguide 44. Laser luminous fluxes irradiated from the irradiation port 44b thereof are made incident on the second condenser lens group 45. Then, these luminous fluxes are converged on the incident end surface of the optical fiber 47.

The optical fiber on the downstream side is for transmitting laser beams converged by the second condenser lens group 45. That is, the incident end of the optical fiber 47 on the downstream side is optically connected to the tapered hollow waveguide 44. The irradiating end part (not shown in the Figure) of this optical fiber 47 is led to a processing position(not shown in the Figure).

According to this embodiment, laser beams oscillated by oscillators (not shown in the Figure) and transmitted by the respective optical fibers B on the upstream side are irradiated from their irradiating end surfaces. These irradiated laser luminous fluxes are made incident on the first condenser lens groups 43. The incident fluxes are converged toward the incident port 44a of the tapered hollow waveguide 44. Then, they are multiplexedly reflected on the tapered inner reflection surface 44c, coupled as uniform and directionless multibeams, collected as they advance thereon and irradiated from the irradiation port 44b. The laser luminous fluxes thus irradiated are provided with uniform strength distribution in a circumferential direction and diffused at a constant angle range α. Then, they are converged by the second condenser lens group 45 and made incident in single focus on the incident end surface of the optical fiber 47 on the downstream side. The laser beams made incident in this way are transmitted therewithin and irradiated from the irradiating end surface of the optical fiber on the downstream side on the processing position (not shown in the Figure).

At the fiber coupler according to the present invention described above, it is not necessary to dispose optical elements precisely and it is possible to couple energy lights from plural systems in single focus. Further, it is possible to prevent damages to the optical fiber given when the parts other than the core thereof are irradiated with strong power lights due to focussing shifts and multifocusses.

What is claimed is:

1. A fiber optical coupler, comprising:
   a plurality of first optical fibers;
   a first lens for converging respective energy lights irradiated from said first optical fibers;
   an optical waveguide, including a cavity having a circular cross-section for receiving said converged energy lights, a reflection surface surrounding said cavity, and apertures provided at both ends of said cavity;
   a second lens for converging energy lights irradiated from said optical waveguide; and
   a second optical fiber for receiving said converged energy lights from said second lens.

2. The fiber optical coupler according to claim 1 wherein the fiber optical coupler is incorporated into a machining system including:
   a headpiece, connected to said second optical fiber, said headpiece condensing the energy lights into a focus; and
   means for moving said headpiece to a desired position.

3. A method for coupling plural energy lights comprising the steps of:
   providing plural energy lights from plural systems;
   receiving the plural energy lights with an optical waveguide;
   coupling the plural energy lights with the optical waveguide;
   converging the coupled energy light from the optical waveguide with a lens; and
   receiving the output of the lens with an optical fiber.

4. The method of claim 3, further comprising the step of:
   machining an object with the energy lights from the optical fiber.

5. A fiber optical coupler, comprising:
   an optical waveguide having a front and rear portion, including;
   at least one incident port formed on the front portion for receiving plural energy lights;
   an irradiation port formed on the rear portion for irradiating energy light;
   an inner reflection surface, having a closed surface from said incident port to said irradiation port;
   a first optical fiber disposed outside of the rear portion of said optical waveguide; and
   a lens, disposed between said optical waveguide and said first optical fiber, whereby said lens converges the energy light irradiated from said optical waveguide and makes the energy light incident on said first optical fiber.

6. The fiber optical coupler according to claim 5, further comprising a plurality of second optical fibers disposed near said incident port of said optical waveguide, whereby said plural energy lights are made incident on said incident port of said optical waveguide by said plurality of second optical fibers.

7. The fiber optical coupler according to claim 5, wherein said first fiber comprises a single fiber system.

8. The fiber optical coupler according to claim 5, wherein said inner reflection surface comprises a hollow inner surface provided in said optical waveguide.

9. The fiber optical coupler according to claim 5, wherein said inner reflection surface has an inner diameter that is reduced in the direction from said incident port to said irradiation port.

10. The fiber optical coupler according to claim 5, wherein said optical waveguide comprises more than one incident port, and further comprises a Y-branch or grating.

11. The fiber optical coupler according to claim 5 wherein the fiber optical coupler is incorporated into a machining system including:
    a headpiece, connected to said first optical fiber, said headpiece condensing the energy light into a focus; and
    means for moving said headpiece to a desired position.

12. The fiber optical coupler according to claim 5, wherein said optical waveguide has a cavity with a circular cross-section.

13. A fiber optical coupler, comprising:
    an optical waveguide having a front and rear portion, including;
    at least one incident port for receiving plural energy lights;
    an irradiation port formed on the rear portion for irradiating the energy light;
    an inner reflection surface, having a closed surface from said incident port to said irradiation port and having an inner diameter that is constant from said incident port to said irradiation port; and
    a first optical fiber disposed outside of the rear portion of said optical waveguide.

14. The fiber optical coupler according to claim 13, further comprising a plurality of second optical fibers disposed near said incident port of said optical waveguide, whereby said plural energy lights are made incident on said incident port of said optical waveguide by said plurality of second optical fibers.

15. The fiber optical coupler according to claim 13, further comprising:
    a lens, disposed between said optical waveguide and said first optical fiber, whereby said lens converges energy light irradiated from said optical waveguide and makes said energy light incident on said first optical fiber.

16. The fiber optical coupler according to claim 13, wherein said inner reflection surface comprises a hollow inner surface provided in said optical waveguide.

17. The fiber optical coupler according to claim 13, wherein the fiber optical coupler is incorporated into a machining system including:
    a headpiece, connected to said first optical fiber, said headpiece condensing the energy light into a focus; and
    means for moving said headpiece to a desired position.

18. The fiber optical coupler according to claim 13, wherein said optical waveguide has a cavity with a circular cross-section.

19. A machining system for machining an object, comprising:

an optical waveguide having a front and rear portion, including;

at least one incident port for receiving plural energy lights;

an irradiation port formed on the rear portion for irradiating energy light;

an inner reflection surface, having a closed surface from said incident port to said irradiation port;

a first optical fiber disposed outside of the rear portion of said optical waveguide;

a headpiece, connected to said first optical fiber, said headpiece condensing the energy light into a focus; and means for moving said headpiece to a desired position to machine the object.

20. The machining system according to claim 19, further comprising a plurality of second optical fibers disposed near said incident port of said optical waveguide, whereby said plural energy lights are made incident on said incident port of said optical waveguide by said plurality of second optical fibers.

21. The machining system according to claim 19, further comprising:

a lens, disposed between said optical waveguide and said first optical fiber, whereby said lens converges energy light irradiated from said optical waveguide and makes the energy light incident on said first optical fiber.

22. The machining system according to claim 19, wherein said inner reflection surface comprises a hollow inner surface provided in said optical waveguide.

23. The machining system according to claim 19, wherein said inner reflection surface has an inner diameter that is constant from said incident port to said irradiation port.

24. The machining system according to claim 19, wherein said optical waveguide comprises more than one incident port, and further comprises a Y-branch or grating.

25. A method for coupling plural energy lights comprising the steps of:

providing plural energy lights from plural systems;

receiving the plural energy lights with an incident port of an optical waveguide;

coupling the plural energy lights with the optical waveguide having an inner reflection surface with a constant inner diameter from an incident port to an irradiation port; and providing the coupled energy light from the irradiation port of the optical waveguide to an optical fiber.

26. A method of machining an object comprising the steps of:

providing plural energy lights from plural systems;

receiving the plural energy lights with an optical waveguide;

coupling the plural energy lights with the optical waveguide;

providing the coupled energy light from the optical waveguide to an optical fiber; and machining an object with the coupled plural energy lights from the optical fiber.

27. The method of claim 26, further comprising the steps of:

converging the coupled energy light from the optical waveguide with a lens; and receiving the output of the lens with the optical fiber.

* * * * *